Figure 1:
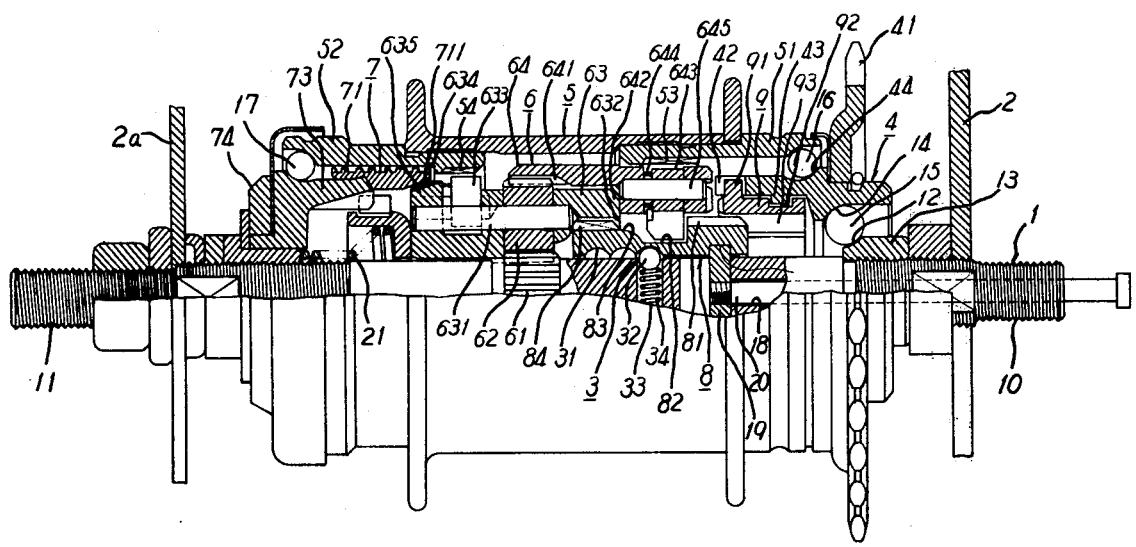

United States Patent [19]

Fukui

[11] 4,160,393
[45] Jul. 10, 1979

[54] MULTIPLE-SPEED HUB FOR BICYCLES

[75] Inventor: Seiji Fukui, Sakei, Japan

[73] Assignee: Shimano Industrial Company Limited, Osaka, Japan

[21] Appl. No.: 787,489

[22] Filed: Apr. 14, 1977

[30] Foreign Application Priority Data

Apr. 21, 1976 [JP] Japan .................................. 51/45864

[51] Int. Cl.² .............................................. F16H 3/44
[52] U.S. Cl. .................... 74/750 B; 192/6 A
[58] Field of Search ...................... 74/750 B; 192/6 A

[56] References Cited

U.S. PATENT DOCUMENTS

| 3,670,856 | 6/1972 | Segawa | 74/750 B X |
| 4,052,914 | 10/1977 | Nakajima | 74/750 B |

Primary Examiner—Benjamin W. Wyche
Assistant Examiner—Frank H. McKenzie, Jr.
Attorney, Agent, or Firm—Stevens, Davis, Miller & Mosher

[57] ABSTRACT

A multiple-speed hub for a bicycle, adapted to house a gear transmission so that the driving force may be transmitted from a driving member to a hub shell at a prescribed transmission ratio, is provided with a positioning and maintaining member between a control member axially movable in the speed-change operation and an axially fixed member, which is, a hub shaft or hub shell.

11 Claims, 15 Drawing Figures

MULTIPLE-SPEED HUB FOR BICYCLES

This invention relates to a multiple-speed hub and more particularly to a multi-speed hub having a transmission mechanism housed within a hub shell so that the power is transmitted from a driving member to the hub shell at a prescribed transmission ratio.

Generally, this kind of speed-change hub comprises a fixed shaft fixed to a bicycle frame, a driving member pivotally supported to the fixed shaft in the relation of being freely rotatable and a speed-change mechanism transmitting the rotation of driving member to the hub shell in a speed increase, speed decrease or direct connection. The hub is adapted to control from the outside a control member movable axially of the fixed shaft through a control means so that a bicycle wheel may be rotated at a desired speed-change stage through a selected transmission route from the driving member to the hub shell. The control member being usually separated from the transmission, has some of the hubs employ the transmission itself as the control member. Hence, the control member of the invention includes both of the above constitutions.

The hub of such construction has no mechanism for positioning and maintaining to the positions the transmission and the control member operable therewith, that is, for defining a particular position of the control member with respect to the axially fixed shaft or the hub shell. Therefore, when the transmission and control member is constructed into the hub shell, the speed-change stage setting may be poor and easily put out of order should the transmission and the control member happen to stop intermediate the determined stages. Thus there is a fear that in an improper speed-change, the transmission or the control member may break down or idle.

Also, even when the speed-change stage is properly set, an inner wire accommodated within an outer cable of the control wire for controlling the transmission and control member from the outside, is liable to lengthen after long use in spite of an accurate speed-change control, resulting in stopping the member at a position intermediate the particular stages.

In addition to the above problem, a lengthening of the control wire requires immediate adjustment because it puts the speed-change stage out of order. Such adjustments require considerable labour.

The invention has been designed in view of the abovementioned problems. It is therefore object of the invention to provide an inner-housed multiple-speed hub whose transmission and control member can be set properly and will maintain the setting at the speed-change stage, the transmission can perform consistently the proper speed-change without stopping at an intermediate portion even when the control wire lengthens after long use, and the proper speed-change stages are always controllable even using lengthened control wire.

In other words, the invention is characterized in that a member for positioning and maintaing the position of the speed-change stage is provided between one of the axially fixed members and the control member movable axially of the fixed shaft by a controller when the bicycle speed is changed, such as the fixed shaft or the hub shell. The positioning and maintaining member makes sure that the position where the control member is controlled by the controller is accurately defined to the desired speed change stage, thereby permitting proper speed-change without a failure.

Figure 2:
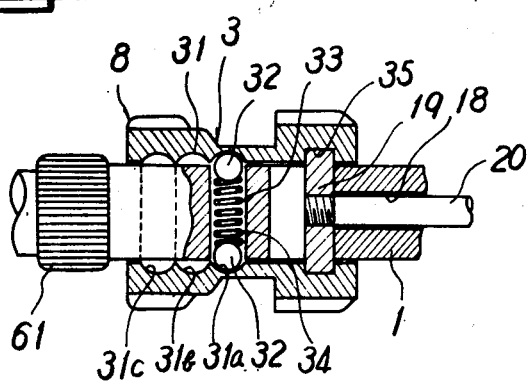
Figure 3:
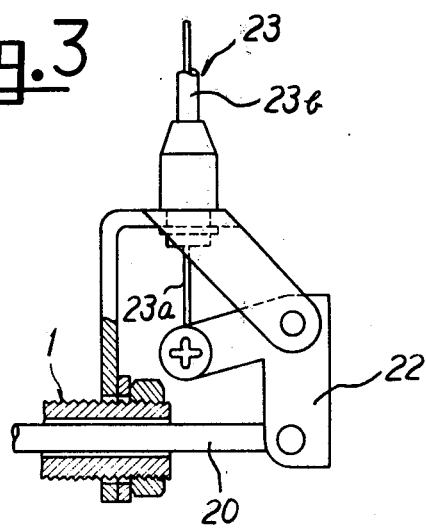
Figure 4:
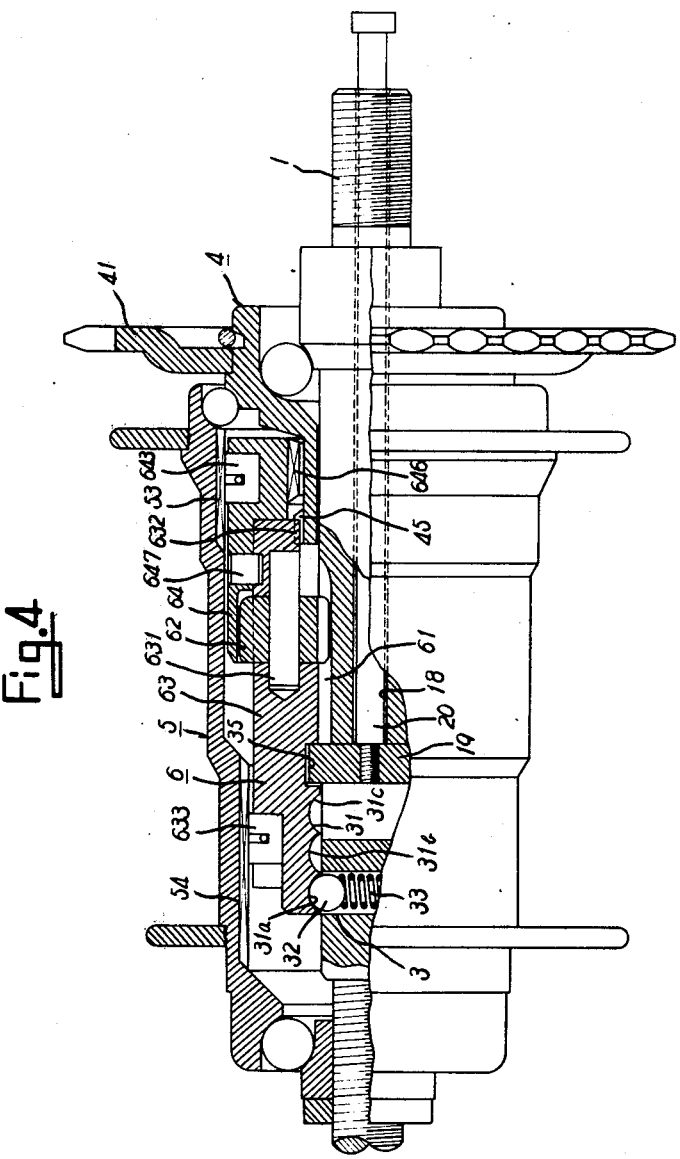

The abovementioned object of the invention and others and the characteristics will be apparent with reference to the accompanying drawings, in which, FIG. 1 is a partially cutaway rear view of a typical embodiment of the invention, FIG. 2 is an enlarged sectional view of an abstracted principal portion of the embodiment in FIG. 1, FIG. 3 is a partially cutaway front view showing an example of a control mechanism of the controller, and FIG. 4 is a partially cutaway rear view of a modified embodiment of the invention.

The inner housed transmissions all capable of changing the speed at: high, middle and low speed stages, are exemplified in the figures. Other inner housed transmissions of three stages or more are similarly appliable so that the invention is not limited only to the illustrated transmission stages.

A typical multiple-speed hub with a coaster brake shown in FIG. 1, comprises; a fixed shaft 1 generally supported to the bicycle frames 2, 2a; a driving member 4 rotatably supported to the fixed shaft 1 and spaced therefrom; a hub shell 5 rotatably mounted on the driving member 4; a transmission 6 housed in the hub shell to speed-change properly the driving force to be transmitted to the hub shell; a control member 8 provided between the driving member 4 and the transmission 6 to relay the driving force under control from the driving member 4 to the transmission 6; and an actuator 9 mounted in connection with the driving member 4 to axially move the transmission in the reverse rotation.

In greater detail, at the peripheries of both ends of the fixed shaft 1 are formed screw threads 10, 11. The screw thread at one end has screwed to it a ball holder 13. Balls 15 are inserted between a ball race 12 of the ball holder 13 and a ball race 14 formed at the inner wall of driving member 4. The driving member 4 is rotatably supported with respect to the fixed shaft 1 at spaced interval through the balls 15.

At the right side radially outer surface of the driving member 4 is fixed a sprocket wheel 41 meshable with a driving chain (not shown) so that the driving member 4 may be forcibly driven by pedalling. At the left side end face of the driving member 4 there is provided an engaging portion 42 engageable with the actuator 9 to be rotatable in cooperation therewith. Driving member 4 also is provided an engaging projection 43. A ball race 44 is formed on the outer periphery of the driving member 4 so as to rotatably support through balls 16 a mounting cone 51 fixed at the right end side of the hub shell 5. At the other end of the hub shell 5 is fixed a mounting cone 52 which is rotatably supported with respect to a brake cone 73 of a brake means 7 to be hereinafter described, through balls 17 inserted between the mounting cone 52 and a ball race of the brake cone 73.

The actuator 9, which is engaged with the engaging portion 42 to be rotatable in cooperation with the driving member 4, is provided with a cam 91 in mesh with the engaging portion 42. A spiral groove 92 on actuator 9 is engageable with the engaging projection 43 while inner teeth 93 of actuator 9 are of control member 8 in mesh with teeth 81 to be hereinafter described. When the driving member 4 rotates normally, the actuator 9 rotates integrally with driving member 4 and when rotating reversely the engaging portion 42 of driving member 4 and the cam 91 of actuator 9 slide to move the actuator 9 toward the left side, with respect to the driving member 4. The actuator 9 controls the brake means 7 and is not to the invention.

The control member 8 which relays the driving force to the transmission 6 and simultaneously controls, is called the clutch and is sleeved onto the fixed shaft 1 in a rotatable and axially movable relation.

The control member 8 has formed thereon an annular groove 82 and an annular projection 83 with a tapered guideface at the substantially intermediate portion of the same. At the right side of the groove 82 are circumferentially provided teeth 81 in mesh with the inner teeth of the actuator 9. At the left side of the annular projection 83 circumfereutially provided teeth 84 in mesh with inner teeth of a gear frame to be hereinafter described. The control member 8 is made movable axially back and forth by operating a controller 20 of a rod or a chain, having a speed-change key 19 inserted into a hollow 18 of the fixed shaft 1, and is rotated by meshing with the inner teeth 93 of actuator 9 so as to relay the driving force to the desired stage of transmission 6.

The transmission 6 housed in the hub shell will be described hereinafter. The transmission is adapted to be axially movable for controlling the control means 8 together with the actuator 9.

The transmission 6 shown in FIG. 1, comprises a sun gear 61 formed on the fixed shaft 1, a plurality of planetary gears 62 in mesh with the sun gear 61, a gear frame 63 supporting the planetary gears 62 by a spindle 631, and a ring gear 64 having inner teeth 641 in mesh with the planetary gears 62 respectively, the gear frame 63 and the ring gear 64 being axially movable as well as rotatable with respect to the fixed shaft 1.

The gear frame 63 is provided at its right side inner surface with inner teeth 632 in mesh with teeth 84 of the control member 8, at the left side with a plurality of middle and low speed transmitting pawls 633 in relation that the tips of pawls tend to easily engage with ratchet teeth 54, and with braking portion 635 having a tapered surface 634 to leftward reduce the braking portion diameter correspondingly to brake shoes of the brake means 7, so that the gear frame 63 is adapted to be rotatable and axially movable with respect to the fixed shaft 1. The ring gear 64 is positioned circumferentially of the right side outer periphery of the gear frame 63 and near the left end of actuator 9 in the relation of being axially movable together with the gear frame 63. Ring gear 64 provided with inner teeth 641 meshes with the planetary gears 62. At substantially its intermediate portion ring gear 64 has a shoulder 642 capable of abutting the right side end surface of the gear frame 63. Ring gear 64 at near the right end engates with a plurality of high speed transmitting pawls 643 in the relation that the tips of pawls tend to be in easy mesh with the ratchet teeth 53 of the mounting cone 51 by a spring 644 through a spindle 645.

The transmission 6, when the driving member 4 is rotating normally, is fed with the driving force of driving member 4 from the actuator 9 through the control member 8, while, when rotating reversely, the ring gear 64 adjacent to the actuator 9 is axially pushed following the axial travel of actuator 9 so that the engaging shoulder 642 of the ring gear 64 abuts the gear frame 63 end face to move the gear frame 63. In other words, in reverse rotation the transmission 6 is not rotatable but axially movable so that the braking portion 635 having the tapered face at the left end of gear frame 63 is allowed to expand the brake shoes of the brake means to be hereinafter described, thereby exerting the brake action.

In addition, the transmission has a spring 21 inserted between the left end of gear frame 63 and a brake cone to be hereinafter described so as to prevent its axial movement during the normal rotation.

Lastly, the brake means 7 will be described. The brake means 7 comprises brake shoes 71 having tapered faces 711 corresponding to the tapered face 634 of the braking portion at the left end of the gear frame 63 and a brake cone 73 holding the brake shoes 71. The tapered face 634 on the gear frame 63 abuts the tapered faces 711 of brake shoes as the transmission moves axially to expand the brake shoes radially outwardly outer periphery of the brake shoes slidably contacts the inner surface of the mounting cone 52, thereby exerting the brake action. In addition, the brake cone 73 is fixed to the bicycle frame 2a through a brake arm 74 and brake shoes 71 abuts in their action against the brake cone 73 in stationary condition so as to slidably contact the mounting cone 52 in the state that the brake shoes are prevented from rotation.

The aforesaid speed-change hub of well-known construction is shown in FIG. 1, and has a positioning and maintaining member 3 provided between the control member 8 movable in speed-change and the axially fixed shaft 1.

The positioning and maintaining member 3 comprises a plurality of engaging grooves 31 and a retainer 32 in engagement with one of the grooves 31 and serves to define the speed-change stage in speed-change by the engagement of the retainer with the one of grooves and at the same time keep axially moving members in the defined position.

The engaging annular grooves 31 comprise recesses of countesunk semi-circular shape corresponding to the speed-change stages and are arranged in alignment at the inner surface at the teeth 8 side of control member 8 with each interval to meet the fixed shaft travel corresponding to the speed-change stage respectively. The grooves 31 shown in FIG. 2 are so arranged that groove 31a corresponds to the high speed stage, 31b to middle stage, 31c to low stage. The grooves are connected through arcuate faces respectively so that the retaining means 32 may slip into any one of the grooves through such arcuate face even when stopped thereon.

The retaining means 32 engageable with one of the grooves 31 is formed of rollable members, such as balls or rollers, biased against the grooves by a spring 33, extending through hole 34 of shaft 1. The engagement of ball 12 and groove 31 is maintained to prevent the control member 8 from undesired axial movement.

The inner surface of control member 8 is provided at the teeth 81 side with an annular groove 35 which engages the speed-change key 19 of the controller 20 inserted into the hollow 18 of fixed shaft 1, so that a push-pull operation of the controller 20 may axially move the control member 8 to the extent corresponding to the speed-change stage.

In addition, the controller 20 has at its tip a bell crank 22 pivoted thereto as shown in FIG. 3. The portion 23a of the push-pull control wire 23 is attached to the free end of bell crank 22 for controlling the push rod movement of 20. The push rod 20 control is not shown to have but may have two pull wires.

As an alternative to the arrangement of the grooves 31 in the control member 8 and the retaining means 32 on the fixed shaft 1, the grooves may be formed on the fixed shaft 1 and the retaining means on the control member.

In the aforesaid construction of the hub of the invention, for high speed-change, the control member 8, as shown in FIG. 1, is moved by the controller 20 as far to its left as possible so as to engage the retaining means 32 with the engaging grooves 31a at this time, the teeth 84 of control member 8 are in mesh with the inner teeth 632 of gear frame 63. Thus the driving force from the normal rotation of driving member 4 is transmitted to drive the hub shell under the high speed stage through actuator 9, control member 8, gear frame 63, planetary gears 62, ring gear 64, high speed transmitting pawls 643, ratchet teeth 53 and mounting cone 51.

In this instance, the middle and low speed transmitting pawls 633 and the ratchet teeth 54 are in line for engagement, but the pawls slide not in mesh with the ratchet teeth due to the rotation speed of hub shell being higher than that of the pawls.

The speed change from high to middle is exerted in such a manner that the controller 20 is pulled to the right so that the retaining means 32 engages the groove 31b. At this time, the high speed transmitting pawls 634 located within the annular groove 82 and in mesh with the ratchet teeth 53 are raised at their tail ends onto an annular swollen portion 83 through the stopped guide face thereof, thereby releasing the pawl tips from the ratchet teeth. Hence, the driving force from the normal rotation of driving member 4 is transmitted to the hub shell 5 through the order of the control member 8, gear frame 63, low speed transmitting pawls 633, ratchet teeth 54 and mounting cone 52.

For changing the speed from middle to low the controller 20 is pulled as far to the right as possible so that the groove 31c engages the retaining means 32. At this time, the teeth 84 at the left end side of control member 8 are disengaged from the inner teeth 632 of gear frame 63 while simultaneously disengaging the high speed transmitting pawls 643 from the ratchet teeth 53. Hence, the driving force transmitted to the control member 8 through the actuator 9 is not directly transmitted to the gear frame 63 but through the pawls 643 in engagement, ring gear 64 and planetary gears 62, and then to the mounting cone 52 through the middle and low speed transmitting pawls 633 and the ratchet teeth 54.

On the other hand, when the driving member 4 is reversely rotated, the actuator 9 in engagement therewith in the normal rotation slides on its cam 91 with respect to the engaging portion 42 of driving member 4 so as to move leftward along the axis of the hub by the sliding of cam 91 while the rotation of driving member 4 is not transmitted to the actuator 9. The leftward movement of actuator 9 moves, regardless of the aforesaid speed-change, the whole transmission along the axis of the hub against the spring 21 so that the brake shoes 71 are outwardly expanded to be pressed against the inner surface of mounting cone 52 for exerting the brake action.

The positioning and maintaining member 3, of aforesaid, is provided between the control member 8 and the fixed shaft 1 of the hub and is adapted to operate the controller 20 to move the control member 8 axially back and forth so that the driving force in normal rotation of the driving member 4 is transmitted to to the transmission 6 through the actuator 9 and control member 8. In another embodiment the hub does not have a control member separate from the transmission and the transmission is axially moved back and forth by the controller 20 so that the driving force from the normal rotation of driving member 4 may be directly transmitted to the transmission 6. The positioning mechanism is provided between the fixed shaft 1 and the transmission or the transmission 6 and the hub shells. For example, the hub shown in FIG. 4 has a plurality of engaging grooves 31 provided at the inner surface of gear frame 63 of transmission 6 corresponding to the speed change stages, and the retaining means provided on the fixed shaft 1 with two balls 32 and the spring 33, are in engagement with one of the grooves.

In the hub of FIG. 4, the groove 31a corresponding to the high speed stage is formed at the left end of gear frame 63, groove forming 31b, the middle stage is intermediate gear frame 63, and groove 31c forming the low speed stage is at the right end of gear frame 63 so that the driving force from the normal rotation of driving member 4 is transmitted from the engagement of the groove 31a with the retaining means 32 through the teeth 45 at the left end outer periphery of driving member 4 to the inner teeth 632 of gear frame 63, planetary gears 62, ring gear 64, high speed transmitting pawls 643 and ratchet teeth 53 to where the teeth 45 are disengaged from the inner teeth 632 by the leftward movement of gear frame 63. On the other hand, the driving of hub shell 5 at reduced speed under the middle and low speed stage is exerted by transmitting the driving force by engagement of the groove 31c with the retaining means 32 from the teeth 45 to the hub shell through the order of the ring gear 64, planetary gears 62, gear frame 63, middle and low speed transmission pawls 633 and ratchet teeth 54. In this instance, the ring gear 64 connected to the gear frame 63 through a connecting pin 647 is moved leftwardly whereby the high speed transmitting pawls 643 are disengaged from the ratchet teeth 53.

Alternatively, the positioning and maintaining member 3 may be formed of the engaging grooves 31 on the fixed shaft 1 and the retaining means 32 at the gear frame 63, or the member 3 provided between the transmission 6 and the hub shell 5 may have the groove on either the transmission and hub shell while the retaining means is on the other.

As seen from the aforesaid description, the mechanism for positioning and maintaining the transmission at a position is provided between the axially movable member and the stationary one. Thus the transmission may be set constantly at a proper speed change stage. Hence, the transmission is prevented from resting intermediately of appointed speed change stages, thereby resulting in properly performing the desired speed change and preventing the transmission from being damaged or from idling.

Furthermore, even when the control wire happens to lengthen after a long use, the transmission is prevented from being at rest intermediately of speed change stages, thereby constantly enabling proper speed changing.

Also, when the control lever of the wire is broken the transmission is controllable, for example, by a push-pull action of the exemplified push rod 20 with bare hands from the outside with no need of dismantling the hub, thereby enabling the adjustment of the transmission to the desired speed change stage to be made.

While the form of embodiments of the invention as herein described constitute preferred forms, it is to be understood that other forms might be adopted, all coming within the scope of the claim which follow.

What is claimed is:

1. A multiple-speed hub for a bicycle, comprising
   (a) a shaft fixable to a bicycle frame,
   (b) a tubular driving member rotatably supported at an axial one side of said shaft,
   (c) a hub shell rotatably supported between said driving member and axially the other side of said shaft,
   (d) a transmission housed within said hub shell, said transmission changing the speed of the driving force to be transmitted from said driving member to said hub shell,
   (e) a control means for operating said transmission, said control means including a control wire of the push-pull type, a rod positioned within the shaft and a bell crank having two arms pivotally attachable to the bicycle frame, one of said arms connected to said control wire and the other attached to said rod,
   (f) a control member movable axially of said shaft by means of said control means, and
   (g) a member within the hub for positioning the transmission and maintaining it at the position, said member being provided between said control member and either the shaft or the hub shell, which is axially unmovable, so that the position controlled by said control means is defined to a desired speed-change stage.

2. The multiple-speed hub for the bicycle as set forth in claim 1, including a clutch provided between said driving member and transmission in the relation of being rotatable axially of said shaft so as to relay the driving force from said driving member to the transmission, said clutch being controllable to be moved by said control means and also serving as said control means, and wherein the positioning and maintaining member is provided between said clutch and said shaft.

3. The multiple-speed hub for the bicycle as set forth in claim 1, wherein said transmission comprises a gear frame having planetary gears and a ring gear having inner teeth in mesh with said planetary gears, said gear frame and ring gear being supported movably with respect to the shaft, said transmission serving as said control means, and the positioning and maintaining member is provided between said transmission and either said shaft or said hub shell.

4. The multiple-speed hub for the bicycle as set forth in claim 3, wherein said positioning and maintaining member is provided between said gear frame of transmission and said shaft.

5. The multiple-speed hub for the bicycle as set forth in claim 3, wherein said positioning and maintaining member is provided between said ring gear of said transmission and said hub shell.

6. The multiple-speed hub for the bicycle as set forth in claim 1, wherein said positioning and maintaining member comprises two or more engaging grooves and retaining means engageable selectively with one of said grooves.

7. The multiple-speed hub for the bicycle as set forth in claim 6, wherein said grooves of said positioning and maintaining member are formed in countersunk semicircular shapes respectively, each of said grooves being connected in alignment with each other.

8. The multiple-speed hub for the bicycle as set forth in claim 6, wherein said retaining means is formed of rolling members.

9. The multiple-speed hub for the bicycle as set forth in claim 6, wherein said retaining means is provided with a spring for biasing said retaining means towards one of said engaging groove.

10. The multiple-speed hub for the bicycle as set forth in claim 6, wherein said engaging grooves are provided at said control member and said retaining means is provided at one of said shaft or said hub shell.

11. The multiple-speed said hub for the bicycle as set forth in claim 6, wherein said retaining means is provided at one of said shaft and said hub shell.

* * * * *